(No Model.)
D. U. STONER.
PORCH IRON.
No. 264,047. Patented Sept. 5, 1882.
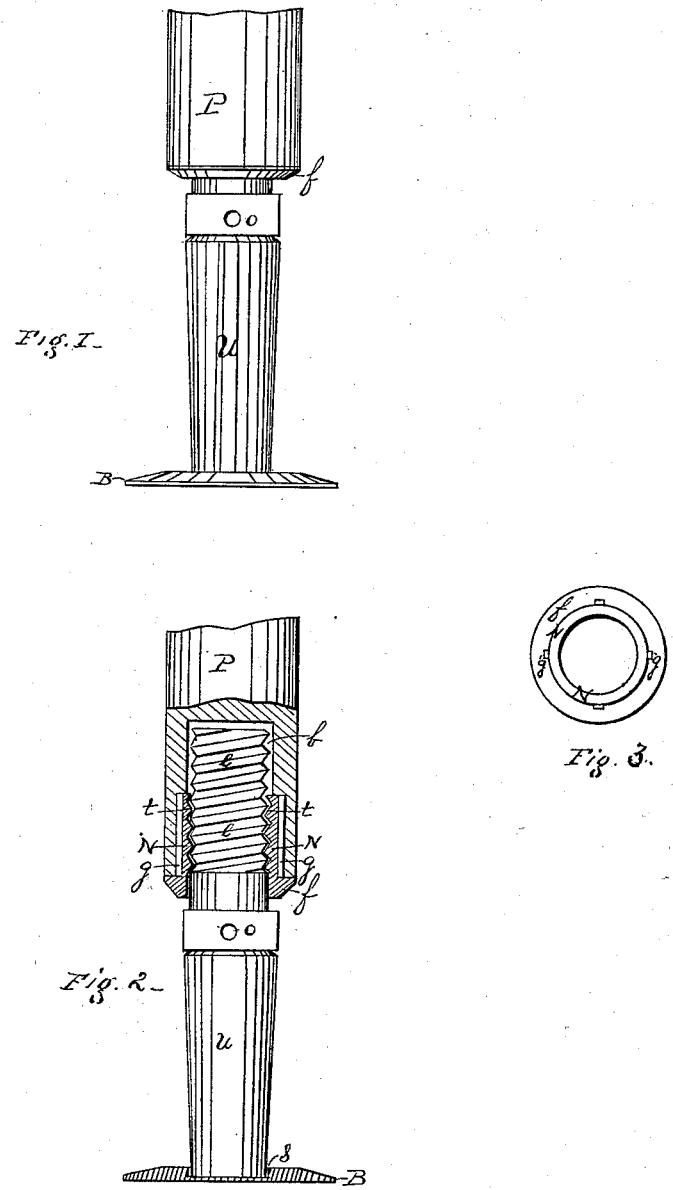
Witnesses
Geo. A. Lam
Frank Cochran
Inventor
David U. Stoner
Mr. Wm. R. Gerhart
His Attorney
N. PETERS, Photo-Lithographer, Washington, D. C.

UNITED STATES PATENT OFFICE.

DAVID U. STONER, OF MOUNT JOY, PENNSYLVANIA.

PORCH-IRON.

SPECIFICATION forming part of Letters Patent No. 264,047, dated September 5, 1882.

Application filed March 30, 1882. (No model.)

*To all whom it may concern:*

Be it known that I, DAVID U. STONER, a citizen of the United States, residing at Mount Joy, in the county of Lancaster and State of Pennsylvania, have invented a new and useful Porch-Iron, of which the following is a specification.

My invention relates to improvements in irons which support the bases of porch-posts; and the objects of my improvements are to maintain the post in its proper position upon any sinking of the floor of the porch, to do so without twisting the post while raising it or exposing the thread of the upright, and to secure the stationary nut to the base of the post. I attain these objects by the mechanism illustrated in the accompanying drawings, in which—

Figure 1 is a view of my device in elevation; Fig. 2, the same with the nut and base of the iron shown in section, and Fig. 3 a top view of the nut.

Similar letters refer to similar parts throughout the several views.

The base B of the porch-iron has a socket or sleeve, $s$, in the center of the top thereof. In this socket or sleeve an upright, $u$, rests, which has the upper end, $e$, cut as a screw. Just below the screw-thread the upright is squared, and through this square part are circular horizontal openings O, running entirely through the upright at right angles to each other. The post P has a bore, $b$, in the bottom, in which a flanged nut, N, is inserted, the thread $t$ of which does not extend through the nut-washer $f$. The nut-washer $f$ projects horizontally from the lower end of the nut, and the bore through it is of such size as to allow the free passage of the screw to be received by the nut. Above the nut-washer, which is quite thick, the nut may be either square or round, in which latter case—the preferable of the two—it has two or more vertical flanges, $g$, projecting from its outer surface, which fit in corresponding grooves in the bore of the post. The nut is inserted into the bore of the post, with the bottom of the latter resting upon the nut-washer $f$, the flanges $g$ being received by the vertical grooves of the bore and preventing the nut from turning in the post. If necessary, the nut-washer $f$ may be fastened to the bottom of the post by means of light screws; but my device requires the mechanism for holding the nut immovable to be as near the center of the post as possible, which is done by the flanges $g$ and their corresponding grooves when using the circular nut, and by the angles when using the square. After the nut is in place the threaded end $e$ of the upright is screwed into it and the other or lower end rested in the socket or sleeve S in the base B, which is fastened to the floor by screws.

When it is desired to raise the post it is done by turning the upright by means of a wrench applied to the squared part thereof, or by using a lever in the horizontal openings O, said upright turning freely in the sleeve of the base B and raising the post by means of its screw-threaded end and the stationary nut. When the screw of the nut embraces the lowest part of that of the upright the bore of the nut-washer $f$ covers the stem of the upright considerably below the end of its thread, so that the post can be raised proportionately without exposing the screw to view. This washer can of course be made as thick as desired.

I do not confine myself to the particular shape of the base B as represented, all that I require being a base of that or other shape having a suitable sleeve for the reception of the foot of the upright.

If preferable, the bore through the nut-washer may be of the same size as that through the body of the nut, with the thread cut through it in the same manner as through the nut.

I am aware of the existence of devices by which the elevation of the post is regulated by means of a nut or washer, on which the lower end of said post rests, working about a stationary threaded upright; but in such case the leverage—that of the radius of the washer and the friction of the washer on the bottom of the post—is so great as to twist the post, causing the upper end to wrench itself from the fastening securing it to the roof or ceiling.

What I claim as my invention, and desire to secure by Letters Patent, is—

1. In combination with a post of a porch, a nut with a nut-washer about its lower end, secured in the base of said post, the upright $u$, and the base B, constructed and operated as and for the purpose set forth.

2. In combination with the post of a porch having vertical grooves in the lower part of its bore, the nut N, having flanges $g$ and nut-washer $f$, the upright $u$, and base B, constructed and operated as specified.

D. U. STONER.

Witnesses:
 WM. R. GERHART,
 H. CARPENTER.